United States Patent [19]

Buchanan

[11] 4,441,814

[45] Apr. 10, 1984

[54] SPECTROGRAPH PROVIDING SPECTRAL REFERENCE MARKS

[76] Inventor: William T. Buchanan, 3518 Roswell Rd., Apt. C-6, Atlanta, Ga. 30305

[21] Appl. No.: 306,517

[22] Filed: Sep. 28, 1981

[51] Int. Cl.³ .................................. G01J 3/18
[52] U.S. Cl. ........................................ 356/305
[58] Field of Search .................. 356/300, 302–305, 356/326, 328

[56] References Cited

U.S. PATENT DOCUMENTS

| | | | |
|---|---|---|---|
| 3,015,250 | 1/1962 | Rosa | 88/14 |
| 3,025,744 | 3/1962 | Collyer | 88/14 |
| 3,191,488 | 6/1965 | Eisner | 88/14 |
| 3,260,180 | 7/1966 | Teeple | 95/1.1 |
| 3,363,525 | 1/1968 | Teeple | 95/1.1 |
| 3,493,303 | 2/1970 | Exton | 356/76 |
| 3,554,647 | 1/1971 | Paine | 356/76 |
| 3,574,462 | 4/1971 | Harvey | 356/76 |

FOREIGN PATENT DOCUMENTS

| | | | |
|---|---|---|---|
| 883471 | 11/1961 | United Kingdom | 356/305 |
| 787909 | 12/1980 | U.S.S.R. | 356/305 |

OTHER PUBLICATIONS

E. Geyer, et al., "On the Use of a Focal-reducer System . . . ", Astron. Astrophys., vol. 80, pp. 248–251, (1979).
Miranda, "Apparent Distortion in a Slitless Spectrograph", Applied Optics, vol. 4, No. 7, pp. 809–813, (1965).
Planet, "Spectroscopy Applied to Hypersonic Atmospheric Penetration", Applied Optics, vol. 3, No. 2, pp. 309–314, (1964).
R. Exton, et al., "Portable Survey Spectrograph", Review of Scientific Instruments, p. 1370, (1964).
S. Cooke et al., "The Design and Construction of a Five-Foot Wadsworth Type Grating Spectr.", Amateur Telescope Making, pp. 88–121.
I. Liu, "A Time-Resolving Spectrograph for Free Flight Balistic Range Application", Applied Optics, vol. 6, No. 7, pp. 1195–1200, (1967).
V. Linnik, "A Slitless Spectrograph with Guiding & Spectral Reference Lines", New Techniques in Astronomy, Chap. I-29, pp. 289–295, (1971).
B. Nelles, et al., "Distortion of Grating Prisms, and their Use in . . . ", Applied Optics, vol. 20, No. 4, pp. 660–664, (1981).
P. Millman, "Objective Prism Radial Velocities," J. of Roy. Astron. Soc. of Canada, vol. XXV, No. 7, pp. 281–293, (1931).
C. Fehrenbach, "Objective Prisms and Measurement of Radial Velocities", Advances in Astron. and Astrophys., vol. 4, pp. 1–27, (1966).
G. Harvey, "Four Years of Meteor Spectra Patrol", Sky and Telescope, Jun. 1974, pp. 378–380.
L. Salanave et al., "Slitless Spectra of Lightning in the Region of 3850 to 6900 Å", J. of Geophysical Research, vol. 67, No. 5, pp. 1877–1884, (1962).
I. Liu, "Spectra Associated with High-Speed Projectiles in Rarefied Air . . . ", Applied Optics, vol. 1, No. 5, pp. 675–677, (1962).
C. Fehrenbach, "Recherches sur la Mesure des Vitesses Radiales au Prisme Objectif", Annales D'Astrophysique, vol. 10, No. 3, pp. 257–281, (1947).
C. Fehrenbach, (Continuation of AAV), vol. 10, No. 4, pp. 306–328, (1947).

*Primary Examiner*—F. L. Evans
*Attorney, Agent, or Firm*—Jones & Askew

[57] ABSTRACT

A slitless spectrograph simultaneously records spectra of transient or moving light sources along with spectral references marks positioned alongside the spectra for calibration of unknown spectral lines. The reference marks are provided by groups of optical components which cause undispersed light from the unknown source to be focused on a film above or below the spectrum. The angles at which the light beams creating the references marks strike the grating of the spectrograph are specifically selected such that the rate of movement of the reference marks caused by a change in the incident angle of light from the light source into the spectrograph is related to the rate of change of the position of dispersed light which falls at the position of the reference mark when the spectrograph is precisely aimed at the light source.

21 Claims, 11 Drawing Figures

Fig_5

Fig_7

Fig_6

Fig_8

Fig_9

FIG. 10

FIG. 11 ced accord-
SPECTROGRAPH PROVIDING SPECTRAL REFERENCE MARKS

TECHNICAL FIELD

The present invention relates to optical spectroscopy, and more particularly relates to a slitless spectrograph useful for measuring the spectra of moving radiant phenomena and those which exist for too short a period to accurately aim the spectrograph.

BACKGROUND ART

Under laboratory conditions, light from a source of light being analyzed can be precisely aligned with a spectrograph instrument and passed through a slit. Light from a source having known spectral lines can also be aligned with the instrument and passed through a separate portion of the slit to provide spectral reference lines. However, some light sources that are desired to be analyzed by spectroscopy are short in duration, or are moving, or occur in groups of point light sources, so that precise aiming of the spectrograph is not possible.

To obtain the spectra of such light phenomena, slitless spectrographs have been designed. Since it is impossible to use a precisely aimed known light source for calibration, various methods have been proposed for providing spectral reference marks on the spectrogram recorded by a slitless spectrograph. In connection with the use of spectrographs to determine the radial velocities of stars, methods have been proposed for recording interference bands, for recording absorption lines by placing an absorbing medium in the optical path, and for recording spectral lengths from a recognizable stellar spectral line. A widely used method is the reversal method in which the spectrum of a star is simultaneously photographed next to a reversed spectrum of the same star.

I. D. Liu has described a slitless spectrograph, in which measurements of the undispersed or "zero order" light from the source is recorded on the same film frame as the first or higher order spectral lines, in an article entitled "Spectra Associated With High-Speed Projectiles In Rarified Air Obtained With Large-Aperture Slitless Spectrograph", in APPLIED OPTICS, September, 1962, Volume 1, No. 5. Liu notes that the zero order mark can be used to calibrate the remainder of the spectrum. However, this method has several disadvantages arising from the fact that the zero order mark is recorded at its normal distance from the first order spectrum. This distance is proportionately large, and a small scale is required to encompass both the zero and later order spectra, resulting in less accuracy in measuring the spectrogram. Also, this method provides only one reference mark. Therefore, the wave lengths of the unknown lines must be calculated by extrapolation, which is not as accurate as interpolation between two known reference marks.

SUMMARY OF THE INVENTION

The present invention is a spectograph which includes optical elements both for dispersing light from an unknown source to record the spectrum thereof, and for directing auxiliary beams of undispersed light from the same light source to be recorded, beside the unknown spectrum, as spectral reference marks of known position from which the wave lengths of the spectral lines of the unknown source can be determined. Broadly described, the invention provides, in a spectrograph including means for dispersing a first beam of light from a light source into spectral components and means for recording said spectral components, the improvement comprising means for directing undispersed light of a second beam from the same light source onto the recording means to a record a reference mark at a position along the axis of dispersion approximately equal to the axial position of spectral components of the dispersed first beam.

The preferred optical elements for directing the auxiliary beams of undispersed light are plane mirrors and lenses positioned to direct the light through or past a dispersing element, such as a grating or prism, at particular angles. Such angles are specifically selected such that when the spectrograph is precisely aimed at the light source, the undispersed reference beam will strike the recording means at a position having a known reference wavelength. The incident angles of these reference beams are further selected such that as the incident angle of the dispersed beam of light varies according to errors in aiming the spectrograph at the light source, the position of the reference marks varies at about the same rate as would a dispersed spectral line of wavelength equal to the reference wavelength. Furthermore, an additional undispersed reference beam can be provided in such a way that the position of its reference mark changes in the opposite direction as the dispersed spectral lines. The latter undispersed beam can be used to correct for errors in the wavelength position of the other reference marks caused by the error in aim.

The record of the spectrum and reference marks is preferably made on light-sensitive film, and is focused by a lens positioned between the dispersing element and the film. The angular relation between the lens and the dispersing element must be specifically set depending on the chosen wavelength positions of the undispersed reference marks. The light from the source is preferably divided into four beams, the first of which strikes the dispensing element directly. Three reference marks caused by undispersed light of the remaining beams are preferably recorded, the second beam being reflected twice by plane mirrors, the third beam being reflected twice by plane mirrors and magnified, and the fourth beam being only once reflected so that its position changes in the opposite direction to the second and third beams.

When a spectrograph is properly constructed according to the present invention, the wavelengths of the unknown dispersed spectral lines can be accurately calculated and checked by referring to reference marks at each end of the spectrum, and the error of spectral position of the reference marks arising from the error in aim of the spectrograph can be accounted for.

Thus, it is an object of the present invention to provide an improved slitless spectrograph.

It is a further object of the present invention to mark on the spectrogram of a slitless spectrograph reference marks generated by an unknown light source itself and recorded simultaneously with the unknown spectrum.

It is a further object of the present invention to provide a slitless spectrograph capable of accurate determination of the spectra of short-lived, moving or clustered light sources.

It is a further object of the present invention to provide a spectrograph which records reference marks near each end of the spectrum so that most unknown wavelengths of the spectrum are located between the reference marks.

Other objects, features and advantages of the present invention will become apparent upon reading the following detailed description of preferred embodiments of the invention, when taken in conjunction with the appended drawing.

DETAILED DESCRIPTION

Figure 1:
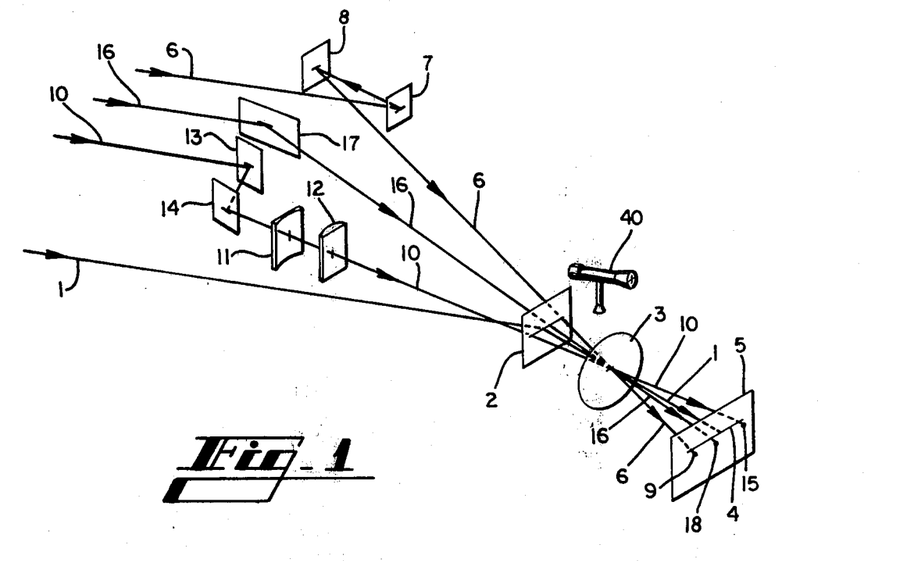
FIG. 1 is a diagrammatic pictorial representation of a spectrograph embodying the present invention.

Referring now in more detail to the drawing, in which like numerals represent like parts throughout the several views, FIG. 1 is a diagramatic representation of a slitless spectrograph embodying the present invention. The optical elements of the spectrograph are fixed to a housing (not shown) for the purpose of recording the spectrum of a light beam 1 from an unknown point source of light. It is assumed that the point source of light is sufficiently distant that all photons from the point source that strike the spectrograph are essentially parallel. The first beam 1 strikes a diffraction grating 2, which in the preferred embodiment of FIG. 1, is a transmittance diffraction grating having 600 grooves per mm, with a ruled length of 76 mm and a ruled width of 65 mm. The optical elements are mounted to be essentially coplanar, the plane being perpendicular to the grating grooves.

Light dispersed by the grating 2 is dispersed into component wavelengths and passes through a lens 3 which focuses the spectrum 4 as a horizontal strip on a photosensitive film 5. The lens 3 and film 5 can be provided in the form of a 35 mm camera having an f/1.8 lens with a focal length of 135 mm. The dispersion of the spectrum is about 120 Å per mm. As will be explained in detail hereinafter, the angle between the plane of the grating 2 and the axis 37 of the lens 3 must be specifically set.

A second beam 6 of light from the same point source initially encounters a plane mirror 7 which reflects the beam 6 onto another plane mirror 8 which reflects the beam through the grating 2. The undispersed or "zero order" light of the second beam 6 passes through the grating 2 and is focused by the lens 3 on the film 5 at a position along the axis of dispersion approximately equal to the axial position of spectral components of the dispersed first beam, but slightly above or below the axis of the spectrum 4. The focused, undispersed light of the second beam 6 forms a first reference mark 9 on the film 5, and is recorded in such a way that the reference mark does not in any way interfere with the recording of the spectrum itself by slightly tilting mirrors 7, 8. Similar adjustments can be made to the third and fourth beam mirrors 13, 14 and 17 described hereinbelow.

The mirrors 7 and 8, as well as the mirrors 13, 14 and 17 to be described hereinbelow, are plane first surface mirrors.

A third beam 10 of light from the same point source initially encounters a plane mirror 13 which reflects the light onto another plane mirror 14, which reflects the light through a negative lens 11 and then a positive lens 12 which recollimates the light following a particular magnification, the significance of which will become clear below. The third beam 10 then passes through the grating 2. The undispersed light of the third beam 10 is focused by the lens 3 as another reference mark 15 on the film 5.

A fourth beam 16 of light from the same point source is initially reflected by a mirror 17 directly through the grating 2. The lens 3 focuses the undispersed light of the fourth beam 16 to form a third reference mark 18 on the film 5. It will be noted that as the incident angle of the first beam with respect to the grating changes, the reference marks 9 and 15 will move in the same direction along the film 5 as dispersed components of the spectrum 4, because the second beam 6 and the third beam 10 are each reflected twice before passing through the grating 2. However, the reference mark 18 will move in the opposite direction, because the fourth beam 16 is reflected only once.

In order to align the spectrograph with the point source, a small spotting telescope 40, including a cross hair sight, is mounted in fixed relation to the other optical components. However, the spectrum of a point source can be accurately determined using a spectrograph embodying the present invention even if the spectrograph is not precisely aimed at the source.

In order to provide for accurate measurement of the unknown spectral components of the spectrum 4, the angles at which the first, second, third and fourth beams impinge upon the grating 2 and pass through the lens 3 must be specifically selected, and the optical components of the spectrograph must be positioned in relation to one another to provide the desired angles. It is preferred that two of the reference marks be positioned near the opposite ends of the first order of the visible spectrum, which extends from 4000 Å to 7000 Å. For example, one spectral reference mark could be located at 6563 Å to correspond to the Fraunhofer-C (H-Alpha) line and the opposite reference mark could be located at 3934 Å to correspond with the Fraunhofer-K calcium line.

A critical design criteria in selecting the incident angles for reference beams is that as the incident angle of the dispersed beam of light varies according to errors in aiming the spectrograph at the light source, the position of the reference marks should vary at about the same rate as would a dispersed spectral line of wavelength equal to the reference mark wavelength position measured when the spectrograph is precisely aimed at the source.

Figure 3:
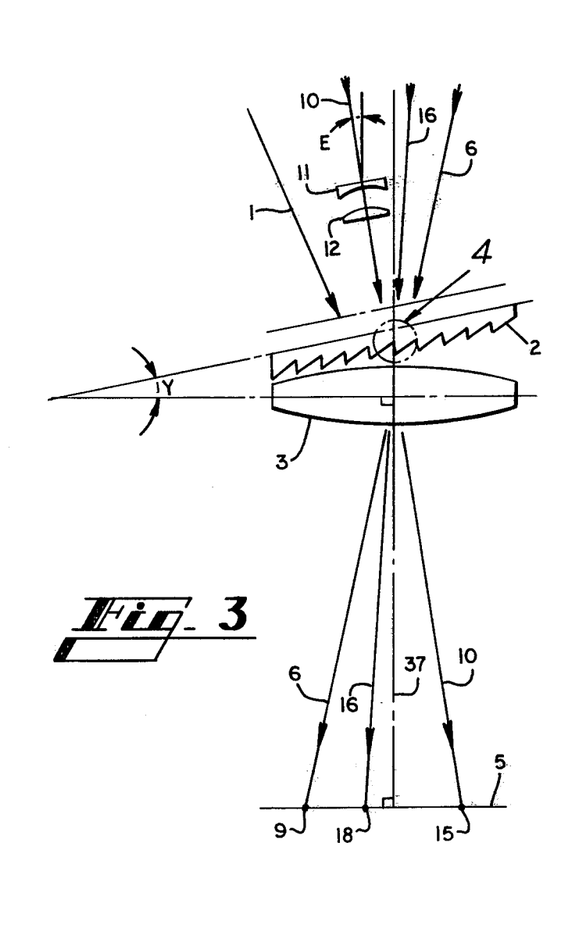
FIG. 3 is an enlarged diagrammatic representation of the grating, lens, and film of the spectrograph shown in FIG. 1, also showing the incident and emerging dispersed and undispersed light beams.
Figure 4:
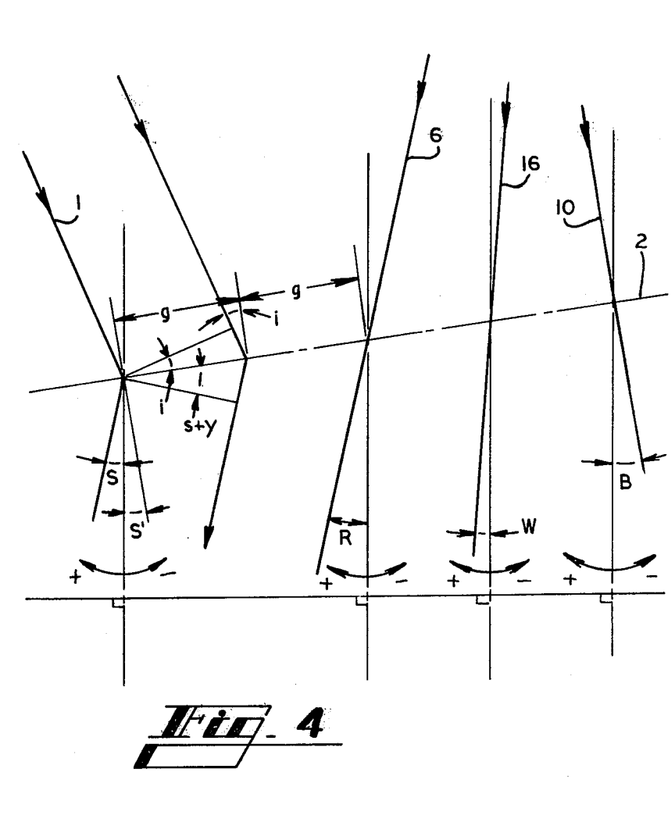
FIG. 4 is an enlarged version of a small portion of the grating of FIG. 3, showing the incident and emerging beams.

FIG. 3 is a diagrammatic plan view of the beams of light from the light source passing through the grating 2 and the lens 3, and being recorded on the film 5. The zero order light of the reference beams 6, 10 and 16 passes through the grating and lens. FIG. 4 shows an enlarged view of a small portion of the grating surface, showing further detail of the interaction of the beams with the grating. The first beam 1 makes an incident angle i with the normal to the surface of the grating, is dispersed by the grating, and emerges at an angle S with respect to a line through the axis 37 of the lens 3. In the various figures, light emerging to the left of the axis of the lens is driven a positive angular dimension and light emerging to the right a negative angular dimension. The second beam 6 emerges at an angle R, the third beam 10 emerges at an angle B and the fourth beam 16 emerges at an angle W. The letter g represents the groove spacing on the diffraction grating, which is a constant. The angle Y is the angle between the normal to the grating and the axis 37 of the lens, also a constant. The equation of diffraction of light by the grating for first order light, to be used in calculating the unknown wavelength of a spectral component, is:

$$\lambda/g = \sin i + \sin (S+Y). \tag{1}$$

In order to construct the spectrograph and fix the proper relationship between the optical elements, the constants of the system must be first calculated for the case in which the spectrograph is precisely aimed at the point source of light, that is, when the point source lies at the center of the cross hairs of the telescope 40. Initially, the desired wavelength for the first spectral reference mark must be arbitrarily selected. As noted above, for purposes of alignment verification, it is helpful to select a wavelength corresponding to a known common spectral line near one end of the visible first order spectrum. For the condition of perfect aim, $\lambda = \lambda_d$, $i = i_o$, $R = R_o$ and $S = S_o$. If the incident unknown wavelength $\lambda$ equals the selected reference mark wavelength $\lambda_d$, then the diffracted light beam 1 is concurrent with the emerging undiffracted reference beam 6, and $S_o = R_o$.

When these conditions are satisfied, it is desired that the undiffracted light beam 6 at angle R, change at the same rate as the diffracted light beam 1, at angle S, when the angle of incidence changes and $\lambda$ is held constant at $\lambda_d$; that is:

$$dR/di = dS/di.$$

The undiffracted light beam 6 at angle R, is reflected twice by plane mirrors positioned so that said beam remains in essentially the same plane; in addition, said bundle undergoes no magnification. Therefore, $dR/di = -1$. It follows that $dS/di = -1$.

Differentiating equation (1) with respect to i, with $\lambda$, g, and Y held constant:

$$0 = \cos i \, di + \cos (S+Y) dS,$$

$$dS/di = -\cos i / \cos (S+Y) \tag{2}$$

At $i_o$ and $S_o$, $$dS/di = -1 = -\cos i_o / \cos (S_o + Y)$$

or $$\cos (S_o + Y) = \cos i_o$$

This equation has two solutions:
- Solution 1: $i_o = S_o + Y$ (This applies for diffracted light bundle 1.)
- Solution 2: $i_o = -(S_o + Y)$ (This applies to the zero order of the unreflected light bundle 1.)

Solution 1 shows that the angle of incidence for light of the second beam 6 striking the grating 2 from the mirror 8 must be equal to the angle of incidence of the first light beam 1, but of opposite sign. It will be noted that the value of Y is uniquely determined when $i_o$ and $S_o$ are selected. Since the foregoing uniquely determines one position of a light beam for a spectral reference mark, any other undiffracted bundles do not meet the requirement that $dR/di = dS/di$ unless the bundle is magnified. It will therefore be noted that undiffracted light of the third beam 10 can also satisfy said requirement if properly magnified.

To solve for the required magnification, let the spectrograph be perfectly aimed with the light source, and let $\lambda = \lambda_f$, where $\lambda_f$ is the selected wavelength position of the second reference mark 15;

$i = i_o$, $B = B_o$;

$S = S'$, where $S'$ is the emerging angle of a diffracted beam of wavelength $\lambda_f$ (see FIG. 4).

$S'_o = B_o$, where $S'_o$ is the emerging angle $S'$ when the spectrograph is perfectly aimed; and $E_o = B_o$, where E is the incident angle of the unmagnified third beam 10 (see FIG. 3), and $E_o$ is such angle when the spectrograph is perfectly aimed. B is the incident angle after magnification.

It is desired that the magnified incident beam 10 emerge undiffracted at angle B such that it changes at the same rate as diffracted beam 1 emerging at angle S', when the angle of incidence i changes and the wavelength of beam 1 is held constant at $\lambda_f$. Thus $$dB/di = -dS/di$$

Also, $$dE/di = 1,$$

and $$dB/di = m \, dE/di$$

where m is the required magnification ratio to be applied to beam 10. As in Equation (2):

$$dS/di = -m = -\cos i_o / \cos (S'_o + Y),$$

or $$m = -\cos i_o / \cos (S'_o + Y) \tag{3}$$

the solution for the magnification ratio.

The fourth beam 16 emerges from the grating 2 at an angle W, and is selected so that W changes in the opposite direction, as the the emerging diffracted beam 1. Since beam 16 is reflected once and is unmagnified, W is directly related to i:

$$dW/di = 1$$

or $$(W - W_o)/(i - i_o) = 1$$

Also, from the foregoing $$dR/di = -1,$$

or $$(R - R_o)/(i - i_o) = -1$$

and $$dB/di = -m,$$

or $$(B - B_o)/m(i - i_o) = -1$$

Therefore, $$R - R_o = W_o - W = (B - B_o)/m = i_o - i. \quad (4)$$

The term $W_o$, like $R_o$ and $B_o$, is a constant determined when the spectrograph is aimed precisely toward the light source, that is, when $i = i_o$.

Figure 5:
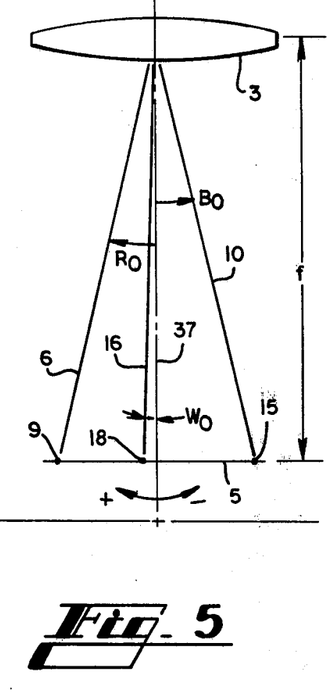
FIG. 5 is a plan view diagram of the lens and film of the spectrograph of FIG. 1, showing the emerging reference beams when the spectrograph is precisely aligned with the light source.
Figure 6:
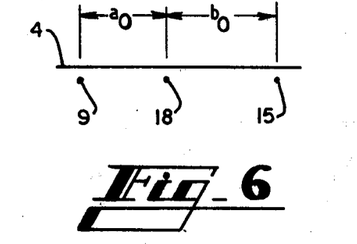
FIG. 6 is a diagrammatic representation of the spectrogram recorded on the film of FIG. 5.

FIG. 5 is a diagrammatic plan view showing the lens 3, the emerging angles of the undiffracted reference beams 6, 10 and 16, and the reference marks 9, 15 and 18, when the spectrograph is precisely aimed. The dimension "f" represents the focal length of the lens 3. FIG. 6 represents an elevation view the spectrum and reference marks 9, 15 and 18 recorded under the circumstances shown in FIG. 5. The dimension $a_o$ is the physical distance between reference marks 9 and 18, $b_o$ the distance between marks 18 and 15. These are constants of the spectrograph that can be determined uniquely. Thus, referring to FIG. 5, $$a_o = f(\tan R_o - \tan W_o), \quad (5A)$$

and $$b_o = f(\tan W_o - \tan B_o). \quad (5B)$$

Figure 7:
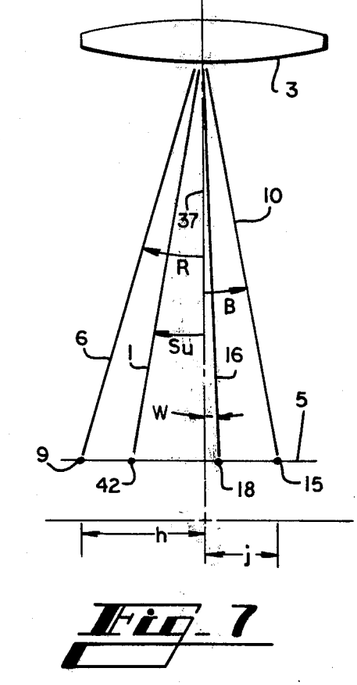
FIG. 7 is a plan view diagram of the lens and film of the spectrograph of FIG. 1, showing the emerging reference beams as well as an unknown spectral line when the spectrograph is not precisely aimed at the light source.
Figure 8:
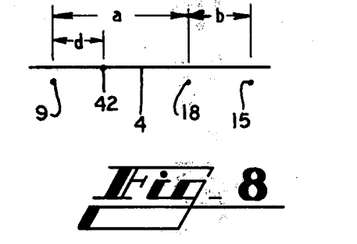
FIG. 8 is a diagrammatic representation of the spectrogram recorded on the film of FIG. 7.

FIG. 7 is a diagramatic plan view showing the lens 3, the emerging undiffracted reference beams 6, 10 and 16, an unknown diffracted component of the beam 1, the reference marks 9, 15 and 18, and the position 42 along the spectrum 4 of the unknown spectral line—all under the circumstance that the spectrograph is not precisely aimed at the point source of light. FIG. 8 represents an elevation view of the spectrum and reference marks recorded under the circumstances shown in FIG. 7. The dimension a is the distance between the reference marks 9 and 18, b the distance between reference marks 18 and 15, h the distance between reference marks 9 and the axis 37 of the lens 3, j the distance between the reference mark 15 and the axis of the lens, and d the distance between the reference mark 9 and the position of the unknown spectral line 42. With these parameters, the error in the wavelength of the reference marks caused by the error in aim of the spectrograph can be determined.

Taking Equation (5A) and subtracting a similar expression for a gives:

$$(a - a_o) = f(\tan R + \tan W_o - \tan R_o - \tan W).$$

From Equation (4):

$$R = i_o - i + R_o = -[(i - i_o) - R_o]$$

and $$W = (i - i_o) + W_o$$

Therefore, $$(a - a_o)/f + \tan R_o - \tan W_o = -\tan[(i - i_o) - R_o] - \tan[(i - i_o) + W_o] \quad (6)$$

Similarly, from equations (5B) and (4):

$$b - b_o = f(\tan B_o - \tan W_o - \tan B + \tan W),$$

$$B = -m(i - i_o) + B_o,$$

and $$(b - b_o)/f - \tan B_o + \tan W_o = -\tan[B_o - m(i - i_o)] + \tan[(i - i_o) + W_o] \quad (7)$$

Equations (6) and (7) can be solved by trial and error or computer iteration methods for $(i - i_o)$; Equation (7) can serve as an independent check on the solution of Equation (6). No film frame boundaries need be defined to solve for $(i - i_o)$; often no boundaries will be evident on the spectrogram. Given $(i - i_o)$, R, B, and W can be determined from Equation (4).

The distance h can be determined from:

$$h = f \tan R, \quad (8)$$

The distance d is measured on the spectrogram, and related to the angle $S_u$, the emerging angle between the unknown beam and the axis 37 of the lens 3, as follows:

$$\tan S_u = (h - d)/f \quad (9)$$

After solving for $S_u$, the wavelength of the unknown spectral line 42 can be determined from Equation (1):

$$\lambda_u = g[\sin i + \sin (S_u + Y)]. \quad (10)$$

The error in the wavelength position of spectral reference mark 9 is determined by substituting R in Equation (1) as though the wavelength at reference mark 9 was an unknown, and subtracting $\lambda_d$:

$$(\Delta \lambda)_d = g[\sin i + \sin (R + Y)] - \lambda_d. \quad (11)$$

The distance j can be determined from:

$$j = -f \tan B. \quad (12)$$

The error in the wavelength position of spectral reference mark 15 is given by:

$$(\Delta \lambda)_f = g[\sin i + \sin (B + Y)] - \lambda_f \quad (13)$$

Where B is substituted for S.

STRUCTURAL EXAMPLE

The following describes use of the foregoing calculations to arrive at actual parameters of a spectrograph embodying the present invention. First, $\lambda_d$ is arbitrarily set to be 6,869.955 Å, the Fraunhofer-B line due to oxygen. The grating selected has a groove spacing of 16,666.67 Å (600 grooves per mm). A camera lens for which f=135 mm is selected for the lens 3. Since the standard film mounting frame for 35 mm film is about 34 mm, the half field of view measures 7.177° since $34/(2\times 135)=\arctan 7.177246°$, and thus S can vary ±7.177° from the axis of the lens 3.

In order to leave a margin of about 1° for the position of the first reference mark 9, the scale can be set such that $\lambda = 7000$ Å at position 6.177° from the axis of the lens. To solve for $i_o$, the incident angle of the first beam 1 at precise aim (a constant to be built into the spectrograph), Equation (1) gives:

$$\lambda_d/g = \sin i_o + \sin (S_o + Y).$$

Since $i_o = S_o + Y$, $$\lambda_d/2g = \sin (S_o + Y) = \sin i_o,$$

$$\sin i_o = \frac{6869.955 Å°}{2(16,666.67 Å°)} = 0.2060986, \text{ and}$$

$$i_o = 11.89382°$$

To solve for Y, the angle between the normal to the grating 2 and the axis 37 of the lens 3, Equation (1) gives:

$$\frac{7000 Å°}{16,666.67 Å°} = \sin (i_o - 1°) + \sin (7.177246° + Y);$$

$$0.42 = \sin (10.89382°) + \sin (7.177246° + Y);$$

$$\sin (7.177246° + Y) = 0.2310015; \text{ and}$$

$$Y = 6.179324°.$$

To solve for $R_o$, the emerging angle of the second beam 6 at precise aim, Equation (1) gives:

$$\lambda_d/g = \sin i_o + \sin (R_o + Y),$$

$$\frac{6869.955 Å°}{16,666.667 Å°} = 0.2060986 + \sin (R_o + 6.179324°),$$

$$\sin (R_o + 6.179324°) = 0.2060987, \text{ and}$$

$$R_o = 5.714499°.$$

To provide the second reference mark 15 at a similar distance from the axis 37 of the lens 3, $B_o$ could be selected to be equal in magnitude to $R_o$. In this case Equation (1) would provide:

$$\lambda_f/g = \sin i_o + \sin (y + B_o),$$

which when solved gives $\lambda_f = 3570.187$ Å. Since this wavelength is undesirably beyond the achromatic range of the 135 mm lens, and for practical geometric reasons, $\lambda_f$ is preferably set at an arbitrarily higher level, $$\lambda_f = 3846.74 \text{ Å}$$

Solving for $B_o$, from Equation (1):

$$\frac{\lambda_f}{g} = \sin i_o + \sin (Y + B_o)$$

-continued $$\sin (6.179324° + B_o) = -0.2060986 + \frac{3846.74 Å°}{16,666.67 Å°} =$$

$$0.0247058, \text{ and } B_o = -4.763642°$$

To determine $W_o$, set the fourth beam 16 to be midway between beams 6 and 10 when $i = i_o$. Thus, $$W_o = (R_o + B_o)/2 = 0.4754285°.$$

To solve for the required magnification m, Equation (3) gives:

$$m = \frac{\cos i_o}{\cos (S_o' + Y)},$$

Since $S'_o = B_o$ when the spectrograph is precisely aimed, $$m = \frac{\cos 11.89382°}{\cos (-4.763642° + 6.179324°)},$$

$$m = 0.978830.$$

To solve for $a_o$ and $b_o$, Equation (5) provides:

$$a_o = f(\tan R_o - \tan W_o) = 12.3891 \text{ mm}$$

$$b_o = f(-\tan B_o + \tan W_o) = 12.3702 \text{ mm}$$

MEASUREMENT OF UNKNOWN SPECTRUM

In use of a spectrogram constructed according to the foregoing calculated dimensions, the telescope 40 is aimed at an unknown light source as precisely as circumstances will permit, and an exposure is made by triggering the shutter of the camera. After the film 5 is developed, assume measurements of the first reference mark 9 and an unknown spectral line 42 disclose that a=19.23 mm, b=5.63 mm and d=4.86 mm. To find the wavelength of the component of the first beam 1 giving rise to the spectral line, $(i-i_o)$ is first determined using Equation (6):

$$(a-a_o)/f + \tan R_o - \tan W_o = -\tan [(i-i_o) - R_o] - \tan [(i-i_o) + W_o].$$

Quantifying the left side of this relationship:

$$\frac{19.23 - 12.39}{135} + \tan 5.714499° - \tan 0.475429° = 0.14244.$$

Then, $$0.14244 = -\tan [(i-i_o) - 5.714499°] - \tan [(i-i_o) + 0.475429°].$$

This relationship can be solved by known mathematical techniques to give:

$$i - i_o = -1.4423°,$$

and therefore $$i = 10.4515°$$

Then R can be found from Equation (4):

$$R = i_o - i + R = 7.1568°,$$

h can be found from Equation (8):

$$h = f \tan R = 135 \tan 7.1568° = 16.951 \text{ mm},$$

The emerging angle $S_u$ of the diffracted beam giving rise to the unknown spectral line can be calculated from Equation (9):

$$\tan S_u = (h-d)/f = 0.08956$$

$$S_u = 5.1178°,$$

and the unknown wavelength can be determined from Equation (10):

$$\lambda_u = g [\sin i + \sin (S_u + Y)]$$

$$= 16.666.67 Å° [\sin 10.4515° + \sin (5.1178° + 6.1793°)]$$

$$\lambda_u = 6288 Å°.$$

The solution is valid for a distortion-free camera lens, and takes into account the error in wavelength position of the reference marks caused by error in aim of the spectrograph.

If the fourth beam 16 is not provided, then R and B cannot be actually determined, and it is necessary to assume $R = R_o$ and $B = B_o$ even though the spectrograph is not precisely aimed. Making this assumption, and using the previously calculated values $i_o = 11.89382°$ and $R_o = 5.714499°$, from Equation (8):

$$h = 135 \tan 5.714499° = 13.509 \text{ mm},$$

from Equation (9):

$$\tan S_u = (13.51 - 4.86)/135$$

$$S_u = 3.66616°,$$

and from Equation (1):

$$\lambda_u = 16,666.67 \text{ Å} \times [\sin 11.89382° + \sin (3.66616° + 6.1793°)] = 6285 \text{ Å}$$

Thus, the error in calculating the unknown wavelength in the present example arising from the assumption that $R = R_o$ and $B = B_o$ is only 3 Å. However, in some applications, especially for large values of $(i - i_o)$, the presence of the fourth beam 16 and reference mark 18 enables more precise wavelength determinations to be made than would be possible using only reference marks 9 and 15.

ERROR OF REFERENCE MARKS

The error in the wavelength position of spectral reference mark 9 is given by Equation (11)

$$(\Delta\lambda)_d = g [\sin i + \sin (R + Y)] - \lambda_d$$

$$(\Delta\lambda)_d = 16.666.67 Å° \times [(\sin 10.4515° +$$

$$\sin (7.1568° + 6.1793°)] - 6869.955 Å°$$

$$= 16,666.67 Å° [.181403 + .230663] - 6869.955 Å°$$

$$= 6,867.718 Å° - 6,869.955 Å°$$

$$= -2.24 Å°$$

The error in the wavelength position of spectral reference mark 15 is given by Equation (13):

$$(\Delta\lambda)_f = g[\sin i + \sin (B + Y)] - \lambda_f.$$

Substituting for B from Equation (4):

$$(\Delta\lambda)_f = g(\sin i + \sin [-m(i-i_o) + B_o + Y]) - \lambda_f.$$

$$(\Delta\lambda)_f = 16,666.67 \text{ Å}(\sin 10.4515° + \sin [0.97883(1.4423°) - 4.763642° + 6.179324°]) - 3846.74 \text{ Å} = 16,666.67 \text{ Å}(0.181403 + 0.049328) - 3846.74 \text{ Å} = 3845.52 - 3846.74 = -1.22 \text{ Å}$$

For many applications these errors $\Delta\lambda$ are small enough to be ignored.

Ideally, lenses 11 and 12 are selected to precisely match the calculated magnification m. If this is not possible, the actual magnification $m_a$ should be used in the above calculations. If lenses 11 and 12 were omitted, $m_a$ would be equal to unity and $(\Delta\lambda)_f$ would be equal to:

$$(\Delta\lambda)_f - 3854.40 \text{ Å} - 3846.74 \text{ Å} = 7.66 \text{ Å}$$

Beam 16 allows correction to be made for this error.

Figure 9:
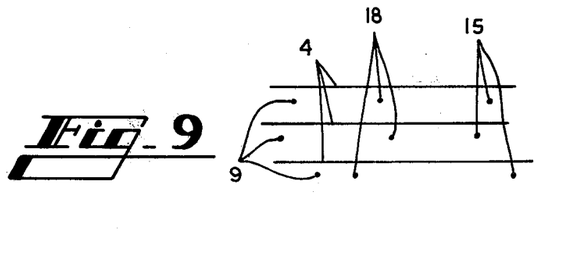
FIG. 9 is a diagrammatic representation of a spectrogram recorded when the spectrograph is aimed generally toward a group of three light sources having various elevations and directions.

In a case where the spectrograph is aimed at more than one point source of light, each source having a different elevation, the spectra of all three sources and reference marks for all three spectra will be simultaneously recorded, as shown in FIG. 9. Thus, the unknown spectra of multiple sources can be analyzed from a single exposure of transient multiple phenomena.

SECOND EMBODIMENT

Figure 2:
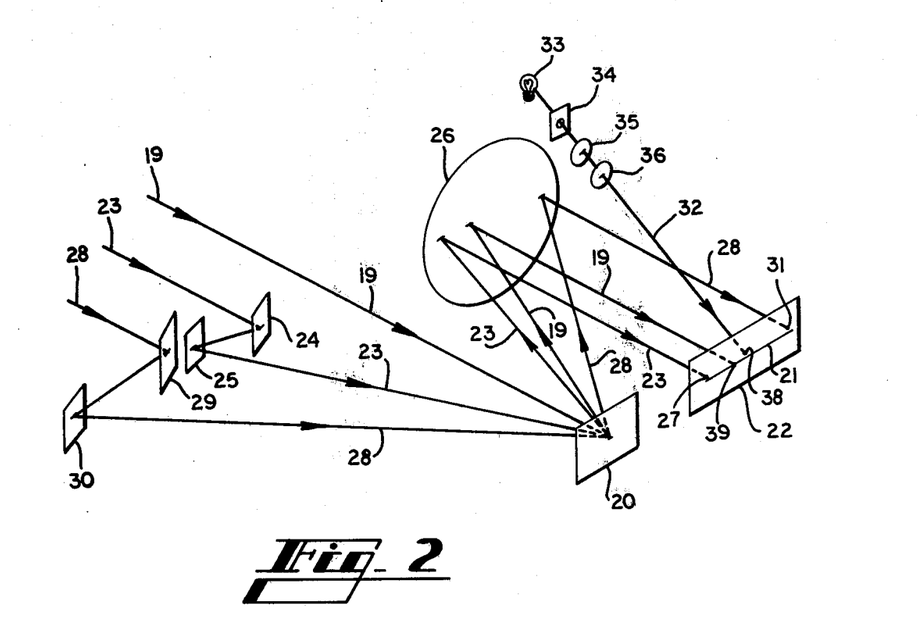
FIG. 2 is a diagrammatic pictorial representation of a second embodiment of a spectrograph embodying the present invention.

FIG. 2 shows a second embodiment of the present invention in which an Ebert mounting is used (principally for ultraviolet light). In the second embodiment, a plane reflectance diffraction grating 20 is used in place of a transmittance grating. A first beam 19 of light from a point source strikes the grating 20, and is reflected and diffracted by the grating 20, onto a concave mirror 26 which focuses the light as a spectrum 21 on a light-sensitive film 22. As described above in connection with the first embodiment, the film 22 is positioned to intercept the first or higher order spectra of the diffracted beam 19.

A second beam 23 from the same light source initially strikes a concave cylindrical mirror 24, which reflects the beam to a convex cylindrical mirror 25, which recollimates the beam and directs it onto the grating 20 which reflects the beam to the concave mirror 26, which focuses the light as a reference mark 27 on the film 22. Thus, the reference mark 27 records only zero order or undiffracted light of the beam 23.

A third light beam 28 from the same source initially encounters a concave cylindrical mirror 29, and a convex cylindrical mirror 30, which recollimates the light and directs the light to the grating 20 which directs the light to the concave mirror 26, which focuses the light at a second reference mark 31 on the film 22. The reference marks 27 and 31 are analogous to reference marks 9 and 15 of the first embodiment, in that the beams 23 and 28 are reflected twice and can be directed in such a manner that they move along the film 22, when the incident angle of the beams changes, at the same rate as diffracted light having a wavelength which falls at the position of the reference mark when the spectrograph is precisely aimed at the light source. Because of the geometry of the reflectance grating, both beams 23 and 28 require magnification.

Figures 10, 11:
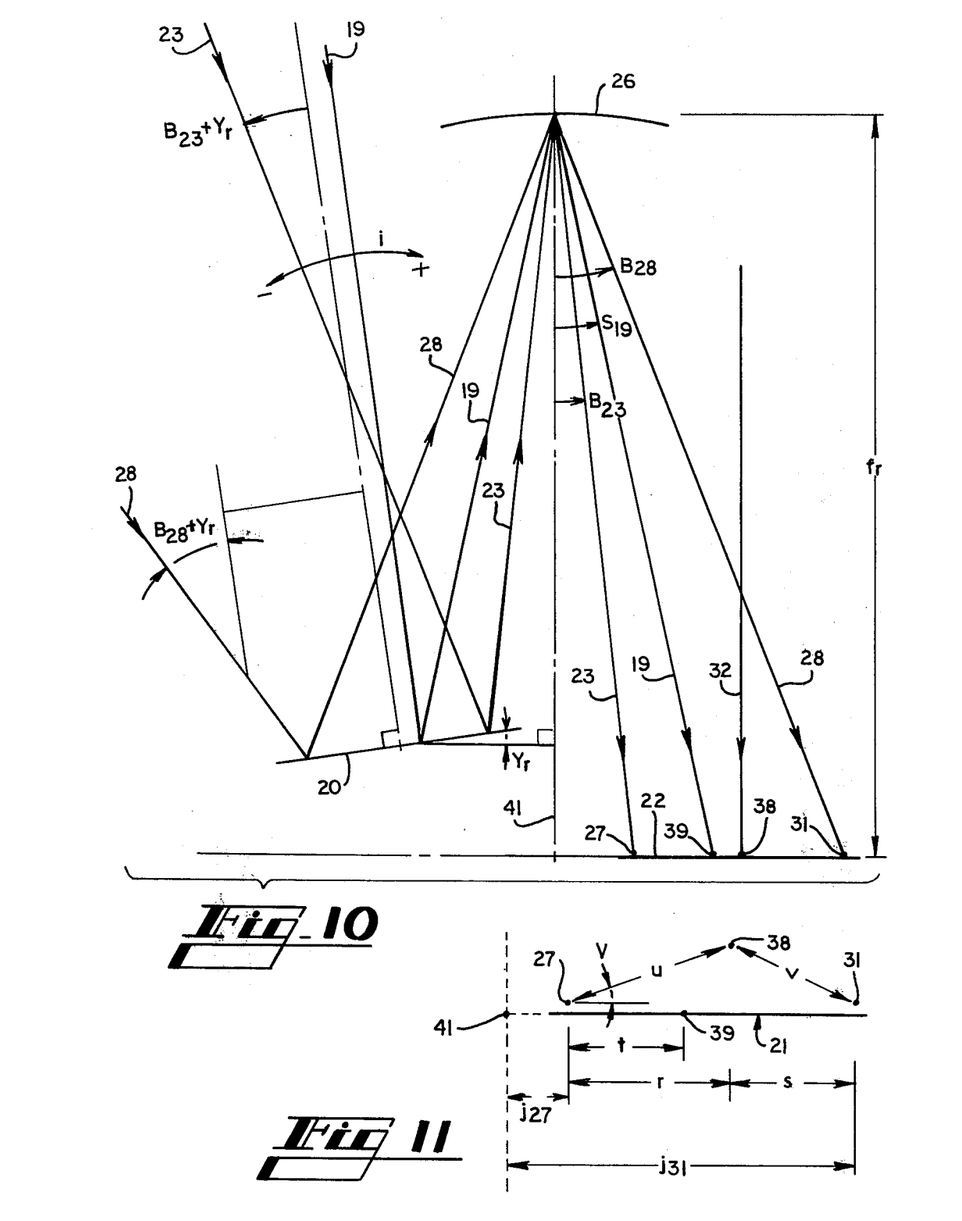
FIG. 10 is a diagrammatic pictorial representation of the grating, concave mirror, and film of the spectrograph shown in FIG. 2 showing the incident and emerging beams.
FIG. 11 is a diagrammatic representation of the spectrogram recorded on the film of FIG. 10.

FIG. 10 shows the angular relations of the light beams and optical elements for the embodiment of FIG. 2, wherein the point 39 represents an unknown spectral line; $Y_r$ is the angle between the reflectance grating 20 and the plane of the mirror 26; $B_{23}$ and $B_{28}$ are the angles between the axis 41 of the mirror 26 and the beams 23 and 28, respectively, emerging from the mirror 26; $j_{27}$ and $j_{31}$ are the distances between the axis 41 and the reference marks 27 and 31, respectively; r is the distance between reference marks 27 and 38; s is the distance between reference marks 31 and 38; and t is the distance between reference mark 27 and unknown line 39.

For the second embodiment, Equation (1) becomes:

$$\lambda/g_r = \sin i + \sin (S + Y_r) \qquad (14),$$

where $g_r$ is the distance between grooves on the grating. The angle $i_o = 0$ for the purpose of these calculations.

Equation (2) is not applicable since magnification of beams 23 and 28 is needed, but Equation (3) becomes:

$$m_{23} = 1/\cos (B_{23-o} + Y_r) \qquad (15),$$

and $$m_{28} = 1/\cos (B_{28-o} + Y_r) \qquad (16),$$

where $m_{23}$ is the magnification ratio of beam 23, and $m_{28}$ is the magnification ratio of beam 28. Equation (4) becomes:

$$(B_{23} - B_{23\text{-}0})/m_{23} = (B_{28} - B_{28\text{-}0})/m_{28} \qquad (17)$$

$$= i_o - i.$$

FIG. 11 shows a diagrammatic view of a spectrograph recorded as shown in FIG. 10. In FIG. 11, $j_{27}$ and $j_{31}$ are the distances between the axis 41 of the mirror 26 and the reference marks 27 and 31, respectively, r and s are the distances along the spectrum between reference mark 38 and the reference marks 27 and 31, respectively, and t is the distance between reference mark 27 and unknown spectral line 39. Since reference mark 38 is not colinear with marks 27 and 31, u and v representing the actual distance between mark 38 and marks 27 and 31 are longer distances than r and s, respectively.

From the spectrograph of FIG. 11, (r+s), t, u and v can be measured. The sum of ($j_{27}$+r) is a constant when beam 32 is generated in the manner shown in FIG. 2. To find r, $$r = u \cos V.$$

Since, by a well-known trigonometric formula $$\cos V = \frac{u + (r+s) - v}{2u(r+s)},$$

$$r = \frac{u + (r+s) - v}{2(r+s)}$$

Then, $s = (r+s) - r$.

To determine angles $B_{23}$, $B_{28}$ and $S_{19}$, the following relations apply:

$$j_{27} + r = j_{27-o} + r_o,$$

or $$j_{27} = j_{27-o} + r_o - r,$$

where $j_{27-o}$ and $r_o$ are known constants of the spectrograph.

Thus, $\tan B_{23-o} = j_{27-o}/f_r$

Also, $j_{31-o}$ is a known constant of the spectrograph, and $$\tan B_{28-o} = j_{31-o}/f_r$$

Furthermore, $$\tan B_{23} = j_{27}/f_r \qquad (18A)$$

$$\tan B_{28} = (j_{27} + r + s)/f_r \qquad (18B)$$

and $$\tan S_{19} = (j_{27} + t)/f_r \qquad (18C)$$

From Equation (17), i is determined, and then from Equation (14) $\lambda_{39}$ is determined.

In the second embodiment, an alternate means is disclosed for generating a third reference mark of a type analogous to the reference mark 18 of the first embodiment. A fourth beam 32 is generated by an independent light source 33, passed through a pinhole in a baffle 34, focused by a negative lens 35, then by a positive lens 36, which focuses the beam at a reference mark 38 on the film 22. If the light source contains visible light, this can be redirected by plane mirrors and magnified by lenses, as in the first embodiment, to form reference marks. The reference mark 38 is used to compensate for the error in wavelength of the reference marks 27 and 31 caused by error in the aim of the spectrograph. A telescope or other aiming device (not shown) is also provided with the second embodiment of the invention.

It will be understood that the means for providing a third reference mark shown in FIG. 2 can also be utilized in the first embodiment shown in FIG. 1 in place of the mirror 17 which produces the third reference mark utilizing light from the unknown source. When the means shown in FIG. 1 is used, an undiffracted light beam is reflected by an odd number of mirrors so that the third reference mark will move in the opposite direction to the movement of the spectrum and the first and second spectral reference marks, which are reflected by an even number of mirrors. This mode requires no power source or internal light, and the marking is done concurrently with exposure of the spectrum. If the means shown in FIG. 2 is utilized to produce the third reference mark, the third reference mark will always lie at the same geometric location on the film, since the internally generated light source remains at all times focused at a particular location on the film. Thus, the means shown in FIG. 2 can record the third reference mark independently from the exposure of the spectrum of the unknown light source. It will be understood that any means for marking a particular fixed location on the film can be substituted for the light source 33, pinhole 34 and lenses 35 and 36.

When lenses in the paths of auxiliary reference beams are specified in the embodiments of the invention described above, cylindrical lenses are preferred. Cylindrical lenses magnify only in the direction perpendicular to the grating grooves, that is, parallel to the axis of dispersion of the spectrum produced by the grating. However, spherical lenses can be utilized, although an additional vertical correction might be required in some cases that would be unnecessary with cylindrical lenses. The focal lengths of the lenses 11 and 12 of the first embodiment are determined in order to provide the calculated magnification.

It will be understood that the magnifying element may be omitted from the reference beams, with some error in wave length determination, the error being correctable if reference beam 16 is provided.

The lens 3 and film 5 are mounted together, for instance, in a commercial camera as noted above. The camera is preferably mounted in a known manner (not shown) so as to travel along an arc about an axis vertically aligned with the center of the grating 2. A known means is preferably provided to lock the assembly at any of a plurality of positions along the arc so that the first order of the visible spectrum can be photographed in one position and the second and third orders can be covered by moving the camera along the arc. As is well known, various filters are used to prevent overlapping of orders. It will be understood that additional reference beams would be provided by additional optical elements to appear on the higher order spectra.

In order to provide versatility, the spectrograph can be provided with an attachable slit unit (not shown) so that the spectrograph can be operated either in the slit mode or in the slitless mode. The mode can be quickly changed by means of a unit that contains an objective lens, a slit and a collimating lens, and which can be slid into place and locked. Light focused by the objective lens illuminates one-half of the slit; a known emission source shines onto a mirror which reflects the light through the other half of the slit. The known and unknown spectra are simultaneously recorded in a known manner.

The present invention is applicable to any wave length of electromagnetic radiation that is subject to be studied by spectrographic means. The term "light" as used herein includes all such radiation. The spectrum of any point source of light far enough away from the spectrograph so that the parallax between light beams striking the various optical components causes negligible error in the measurements can be measured. The spectra of point sources, line sources or clusters of discreet light sources can be measured.

Although a diffraction grating is the preferred dispersing element for use in a spectrograph embodying the present invention, any optical element used for dispersing light into its various spectral components can be used. For example, a prism could be used to receive and disperse the first beam from a light source, and the second, third and fourth beams could be routed past the prism to a camera lens larger than the prism. Since refraction by a prism is irrational, the required magnification of the beams forming spectral reference marks would have to be determined empirically.

It will thus be seen that the present invention provides optical elements positioned in a slitless spectrograph such that in addition to the unknown spectrum of a light source, reference marks are recorded alongside the spectrum using undispersed light, the reference marks being placed such that they can be used to calibrate the wavelength of any line of the unknown spectrum, within a range of error of aim of the spectrograph toward the light source. The spectrograph may be constructed to provide a smaller or greater number of reference marks than shown herein for the preferred embodiments. A spectrograph embodying the present invention can be easily and efficiently used to simultaneously record unknown spectra and reference marks with a minimum of preparation. The spectrograph need merely be roughly aimed at a light source or cluster of sources and the film immediately exposed. Thus, the spectrograph is particularly useful for recording moving or transient light sources.

While this invention has been described in detail with particular reference to preferred embodiments thereof, it will be understood that variations and modifications can be effected within the spirit and scope of the invention as described hereinbefore and as defined in the appended claims.

I claim:

1. In a spectrograph including means for dispersing a first beam of light from a light source into spectral components along an axis of dispersion and means for focusing and recording said spectral components, the improvement comprising:
   means for directing undispersed light of a second beam from said light source through said focusing means onto said recording means to record a reference mark approximately at a position along the axis of dispersion at which a first particular dispersed wavelength appears when present in the spectrum of said light source.

2. The apparatus of claim 1, wherein said means for dispersing said light comprises a diffraction grating; wherein said means for recording spectral components comprises a light-sensitive film; and wherein said focusing means comprises an optical lens for focusing light diffracted by said grating onto said film.

3. The apparatus of claim 1, wherein said means for directing undispersed light of said second beam comprises an even number of mirrors placed in the path of said second beam to reflect said second beam in succession and to direct said second beam through said focusing means onto said recording means at the position of said particular dispersed wavelength on the axis of dispersion.

4. The apparatus of claim 1 further comprising means for magnifying said second beam.

5. The apparatus of claim 3 wherein said even number of mirrors are positioned and said dispersing means oriented such that as the aim of the spectrograph toward the light source changes, the position of said reference mark on said recording means varies in the same direction and at approximately the same rate as the corresponding position of said first particular dispersed wavelength.

6. The apparatus of claim 3, further comprising means for directing undispersed light of a third beam from said light source through said focusing means onto said recording means, including an even number of mirrors placed in the path of said third beam to reflect said third beam in succession, and means for magnifying said third beam, said undispersed third beam being directed through said focusing means onto said recording means to record a second reference mark at a position along said axis of dispersion at which a second particular dispersed wavelength appears when present in the spectrum of said light source, spaced apart from said first reference mark.

7. The apparatus of claim 6 wherein said even number of mirrors reflecting said third beam are positioned, and the magnification of said magnification means is selected with respect to the dispersive characteristics and orientation of said dispersing means, such that as the aim of the spectrograph toward the light source changes, the position of said second reference mark on said recording means varies in the same direction and at approximately the same rate as the position of said second particular dispersed wavelength.

8. The apparatus of claim 6 further comprising means for directing undispersed light of a fourth beam from said light source through said focusing means onto said recording means, including an odd number of mirrors placed in the path of said fourth beam to reflect and direct said undispersed fourth beam through said focusing means onto said recording means to record a third reference mark at a position along the axis of dispersion spaced apart from said first and second reference marks, the position of said third reference mark in relation to said first and second reference marks being related to the error of aim of said spectrograph and enabling determination, when such an error in aim occurs, of the respective distances between the recorded positions of said first and second reference marks and the respective positions at which said first and second particular wavelengths appear when present in the spectrum of the light source, said distances being related to said error in aim, and being zero when there is no error in aim.

9. The apparatus of claim 8 wherein said mirrors are angled with respect to said dispersing means so as to direct said undispersed second, third and fourth beams onto said recording means along a line parallel to, but spaced slightly from, said spectrum of said first beam.

10. The apparatus of claim 6, further cmprising means for directing undispersed light of a fourth beam from a second light source including an odd number of mirrors placed in the path of said fourth beam to direct said fourth beam through said focusing means onto said recording means to record a third reference mark at a position along the axis of dispersion spaced apart from said first and second reference marks, the position of said third reference mark in relation to said first and second reference marks being related to the error in aim of said spectrograph, and enabling determination, when such an error in aim occurs, of the respective distances between the recorded positions of said first and second reference marks and the respective positions at which said first and second particular wavelengths appear when present in the spectrum of the light source, said distances being related to said error in aim, and being zero when there is no error in aim.

11. The apparatus of claim 8, further comprising optical means for enabling said spectrograph to be aimed toward said light source.

12. The apparatus of claim 11, wherein said means for dispersing said light comprises a diffraction grating; wherein said means for recording spectral components comprises light-sensitive film; wherein said means for focusing said spectral components comprises an optical lens; and further comprising a housing for mounting said mirrors, said magnification means, said grating, said film, said lens, and said optical means for aiming said spectrograph, at fixed positions.

13. The apparatus of claim 12, wherein the paths of said first, second, third and fourth beams lie approximately in the same plane; and wherein said first, second and third reference marks are recorded simultaneously with said spectral components of said first beam.

14. A method of recording and calibrating the spectrum of an unknown light source, comprising the steps of:
 dispersing a first beam of light from the source into spectral components along an axis of dispersion;
 focusing and recording said spectral components on a recording medium; and
 directing undispersed light of a second beam from said light source through said focusing means onto said recording medium to record a reference mark approximately at a position along the axis of dispersion at which a first particular dispersed wavelength appears when present in the spectrum of said light source.

15. The method of claim 14, wherein said step of directing said second beam onto said recording medium comprises reflecting said second beam with an even number of mirrors; and further comprising means for reflecting a third beam from said light source off an even number of mirrors onto said recording medium to record a second reference mark at a position along the axis of dispersion at which a second particular dispersed wavelength appears when present in the spectrum of said light source, spaced apart from said first reference mark, said first and second reference marks moving along the axis of dispersion with changes in the aim of said spectrograph toward the light source in the same direction and at approximately the same rate as said first and second particular dispersed wavelengths.

16. The method of claim 15, further comprising the step of reflecting a fourth beam from said light source from an odd number of mirrors onto said recording means to record a third reference mark at a position along the axis of dispersion spaced apart from said first and second reference marks, said third reference mark moving along the axis of dispersion with changes in the aim of said spectrograph toward the light source in the opposite direction from the direction in which said first and second reference marks move.

17. In a slitless spectrograph including means for dispersing a first beam of light from a light source comprising a plurality of wavelengths into spectral components by wavelength along an axis of dispersion, and means for focusing and recording said spectral components, the improvement comprising:
 reflecting means for collecting a second beam of light from said source and reflecting undispersed light of said second beam through said focusing means onto said recording means to record a reference mark approximately at a position along the axis of dispersion at which a first particular dispersed wavelength appears when present in the spectrum of said light source.

18. The spectrograph of claim 17, wherein said reflecting means is positioned and said dispersing means is oriented to direct said undispersed second beam onto said recording means at an angle calculated to cause said reference mark to move along the axis of dispersion with changes in the aim of the spectrograph toward the light source in the same direction and at approximately the same rate as said first particular dispersed wavelength.

19. The spectrograph of claim 18, wherein said reflecting means directs said second beam to encounter said dispersing means prior to said focusing means.

20. The spectrograph of claim 18, further comprising magnification means for changing the magnification of said undispersed second beam by an amount selected with respect to the dispersive characteristics of said dispersing means and the orientation of said reflecting means so as to cause said reference mark to move along the axis of dispersion with changes in the aim of said spectrograph toward the light source in the same direction and at approximately the same rate as said first particular dispersed wavelength.

21. A spectrograph comprising:
a housing defining means for admitting light from a light source into said housing;
means for dispersing a first beam of the light from said source into its spectral components and for focusing said spectral components onto a recording medium; and
means for providing an even number of reflections of a distinct undispersed reference beam of the light from said source and for focusing said reference beam on said recording medium to form a reference mark at a position at which a particular dispersed wavelength appears when present in said first beam.

* * * * *

UNITED STATES PATENT AND TRADEMARK OFFICE
CERTIFICATE OF CORRECTION

PATENT NO. : 4,441,814
DATED : April 10, 1984
INVENTOR(S) : William T. Buchanan

It is certified that error appears in the above-identified patent and that said Letters Patent is hereby corrected as shown below:

Column 5, line 24, "driven" should read -- given --.

Column 10, line 16, "$S_o'$" should read -- $S'_o$ --.

Column 13, line 17, "-" should read -- = --.

Column 17, claim 10, line 29, "cmprising" should resd -- comprising --.

Signed and Sealed this

Twenty-ninth Day of January 1985

[SEAL]

Attest:

DONALD J. QUIGG

Attesting Officer     Acting Commissioner of Patents and Trademarks